July 2, 1946.  A. J. PARRAGA  2,403,190
CAKE CUTTER
Filed Oct. 18, 1944  3 Sheets-Sheet 3

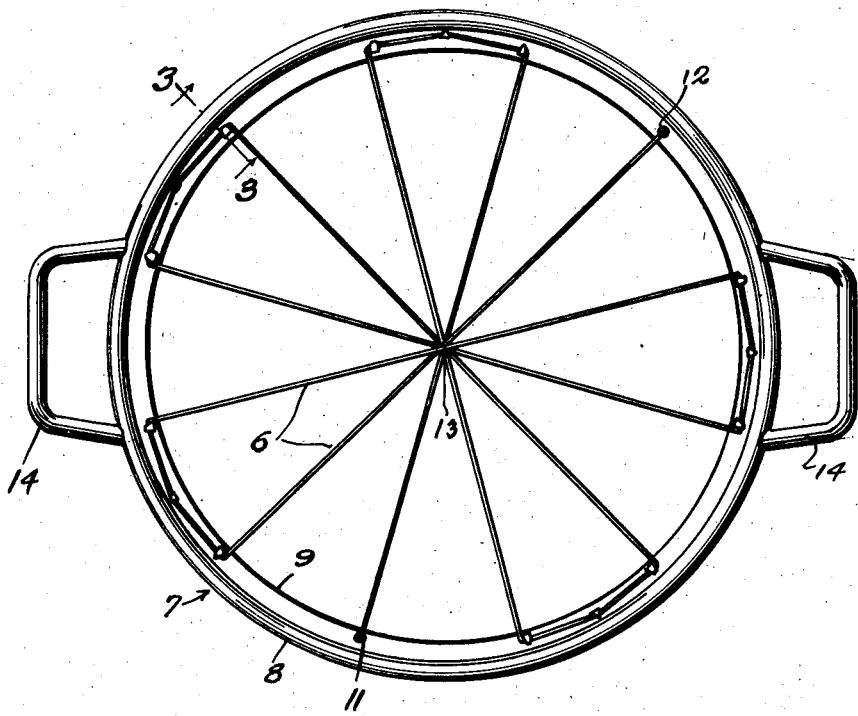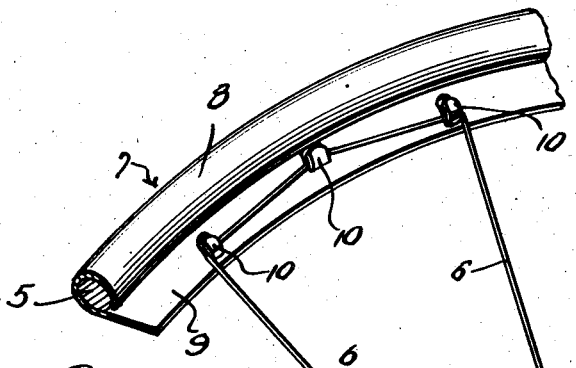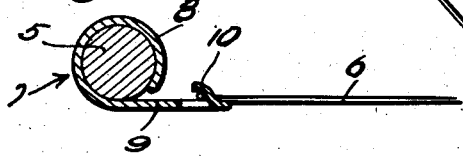

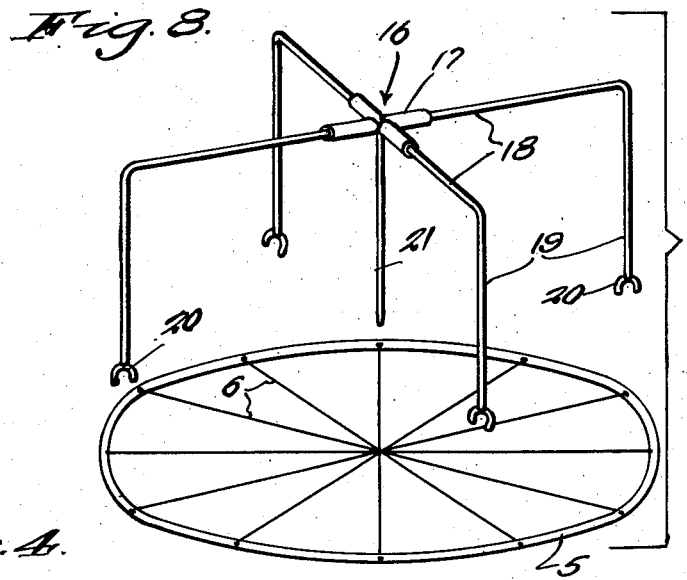
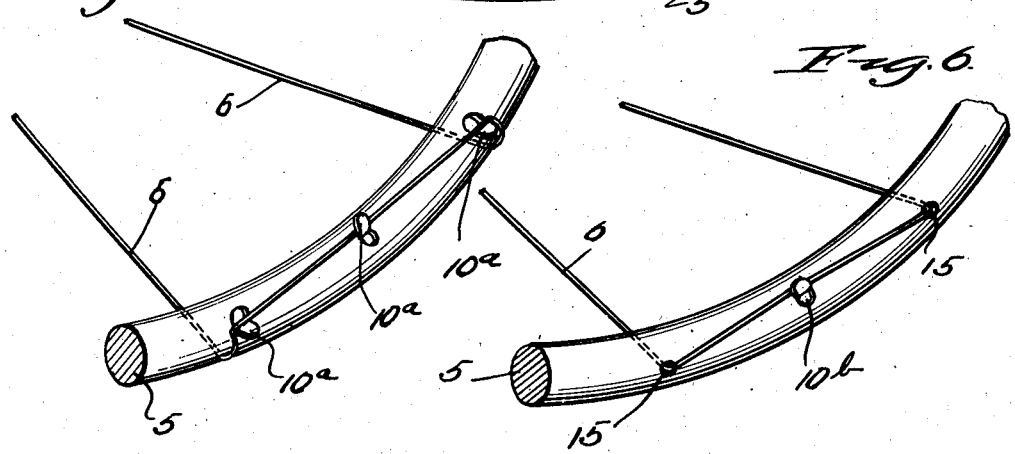
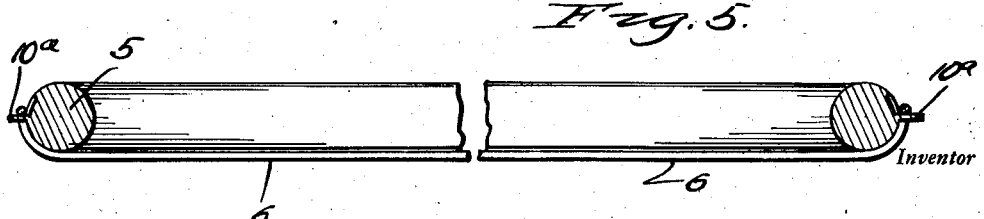

Inventor
Alfredo J. Parraga
By Clarence A. O'Brien
and Harvey B. Jacobson
Attorneys Patented July 2, 1946

2,403,190

UNITED STATES PATENT OFFICE 2,403,190

CAKE CUTTER

Alfredo J. Parraga, Vibora, Cuba

Application October 18, 1944, Serial No. 559,315
In Cuba November 30, 1943

7 Claims. (Cl. 30—303)

This invention relates to a cutter that may be conveniently employed for cutting circular cakes into portions or slices of equal size.

The primary object of my invention is to provide a cake cutter that is of strong and rigid construction, capable of being readily and economically manufactured, and highly efficient in use.

Generally described, the present cutter includes a circular frame having a plurality of equally spaced radial cutting elements mounted therein, and means to facilitate the application of a downward pressure upon the frame so as to force the cutting elements downwardly through the cake.

The exact nature of the present invention, as well as specific objects and features thereof, will become apparent from the following description when considered in connection with the accompanying drawings, and the invention consists in the novel form, combination and arrangement of parts hereinafter more fully described, shown in the drawings and claimed.

In the drawings:

Figure 1 is a top plan view of a cake cutter constructed in accordance with the present invention.

Figure 2 is an enlarged fragmentary perspective view more clearly illustrating details of the cutter shown in Figure 1.

Figure 3 is an enlarged fragmentary radial section taken on line 3—3 of Figure 1.

Figure 4 is a view somewhat similar to Figure 2 of a modified form of the invention.

Figure 5 is a diametric sectional view, partly broken away, of a cake cutter of the form illustrated in Figure 4.

Figure 6 is a view similar to Figure 4 of still another form of the invention.

Figure 8 is a developed perspective view showing a special means or device for forcing the present cake cutter downwardly and thereby causing the cutting elements to divide the cake into a plurality of portions or slices.

Figure 9:
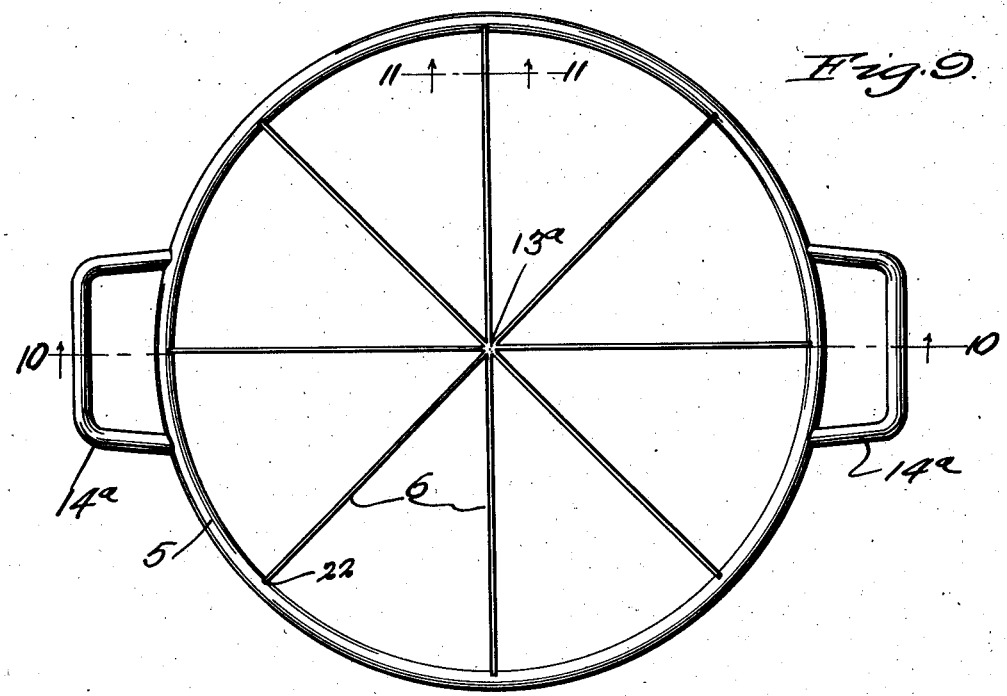
Figure 9 is a plan view of a still further embodiment of the invention.

Referring in detail to the drawings, the present cake cutter comprises a frame embodying a circular ring 5 of circular cross section, and a plurality of equally spaced radial cutting elements 6 mounted in the frame.

In the embodiment of Figures 1 to 3, inclusive, the ring 5 is formed of heavy wire, and the frame further embodies a circular sheet metal ring 7 whose outer marginal portion is snugly rolled around the ring 5, as at 8, and whose inner marginal portion 9 is flat and projects inwardly of the ring 5 at the bottom of the latter. The inner marginal portion 9 of the sheet metal ring has a plurality of sets of short fingers or tongues 10 struck or pressed upwardly therefrom and normally occupying a straight vertical position, as indicated by dotted lines in Figure 3. There are three equally spaced tongues 10 in each set, as shown clearly in Figures 1 and 2. A continuous length of fine wire is strung in the frame so as to provide equally spaced radial portions that form the cutting elements 6. As shown, the sets of tongues 10 are provided in two series, those of each series being equally spaced, and there being two sets in one series and three sets in the other series. Also, the spaces left between the respective series are twice the size of the spaces between the sets. Thus, one end of the wire is fastened at 11, by welding or the like, to the portion 9 of the ring 7, and the wire is then extended diametrically of the frame to an end tongue 10 of one set, the point of fastening 11 being intermediate adjacent sets of the two series. The wire is then passed outwardly around the tongues 10 of the first set, then diametrically of the frame to an end tongue of an opposed set, and so on, the other end of the wire being finally fastened by welding, or the like, as at 12, intermediate the other adjacent sets of the two series. In stringing the wire in the frame, said wire is placed under tension, and this tension is finally increased by bending the tongues 10 outwardly and downwardly to the full line position of Figures 1 to 3, inclusive. When this is done, the wire is securely connected to the frame, passing between the tongues 10 and the upper surface of the portion 9 of the ring 7. Where the portions of the wire cross at the center of the frame, they are preferably welded together or secured together by soldering, as generally indicated at 13. To facilitate downward pressure upon the cutter so as to cause the cutting elements 6 to pass through the cake, the frame may be provided with diametric outwardly projecting handles 14. In this embodiment, the ends of the handles 14 are secured by welding or soldering the same to the rolled portion 8 of the ring 7.

In the embodiment of Figures 4 and 5, the sheet metal ring 7 is dispensed with, and the sets of tongues or fingers 10a are struck directly from the wire ring 5 at the outer side of the latter. In this construction, the fine wire passes downwardly and under the ring 5 from the end fingers 10a of each set, and the ends of the fine wire are secured directly to the ring 5. By bending the fingers 10a upwardly, the fine wire may be placed under additional tension after it has been strung on the ring 5, as indicated by dotted lines in Figure 5.

Figure 7:
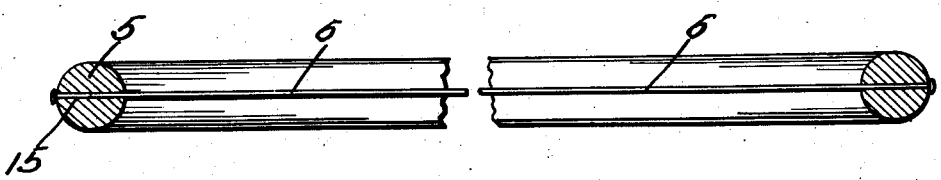
Figure 7 is a view similar to Figure 5 of the construction shown in Figure 6.

In the form of Figures 6 and 7, the construction is similar to that of Figures 4 and 5, except that the end fingers 10a of each set are dispensed with, a single finger 10b is provided where the intermediate finger 10a of each set is provided in Figure 4, and the wire is passed through horizontal openings 15 provided in the wire 5 at the points where the end fingers 10a are located in the form of Figure 4. Thus, the anchoring means for the fine wire in Figures 6 and 7 consists of a set of elements, each set consisting of spaced openings 15 and a single finger 10a intermediate said openings. The wire is placed under additional tension in this embodiment after being strung on the ring 5, by bending the single tongue 10b upwardly with respect to each set of fastening elements. Otherwise, the constructions of Figures 4 and 6 are essentially of the same general character as that of Figure 1.

Under certain conditions, it is not desirable to provide the handles 14, and a special device is then provided to facilitate downward pressure upon the cutter in effecting the cake cutting operation. This special pressure device is shown in Figure 8 and consists of a sheet metal spider 16 having a plurality of equally spaced radial tubular arms 17 in which are fitted and secured the inner ends of angular arms 18 having depending outer end portions 19 that are provided on their lower ends with U-shaped saddles 20 arranged to seat upon the frame of the cutter at equally spaced points. Also, rigid with and depending from the center of spider 16 is a pin 21 arranged to pierce the cake at the center of the latter so as to assist in positioning and steadying the pressure device when the latter is in use. By exerting a downward pressure upon the spider 16, the device will cause such pressure to be transmitted to the frame of the cutter so that the cutting elements 6 will pass downwardly through the cake and thereby divide the same into a plurality of equal portions or slices.

Figure 10:
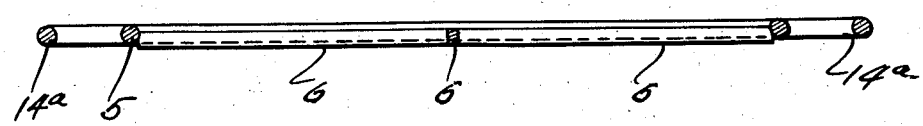
Figure 10 is a diametric section thereof taken substantially on line 10—10 of Figure 9.
Figure 11:
Figure 11 is an enlarged fragmentary section taken on line 11—11 of Figure 9.

In the embodiment of Figures 9 to 11, inclusive, the ring 5 and cutting elements 6, together with the handles 14a, are cast in one piece, the cutting elements 6 being in the nature of vertically narrow radial strip members joined at the center of the ring 5, as at 13a, and integrally connecting with the ring 5 at their outer ends, as indicated at 22.

From the foregoing description, it will be seen that I have provided a cake cutting or slicing device that is relatively simple in construction, inexpensive of manufacture, and very efficient in performing the function for which it is intended. Minor changes in the details of construction illustrated and described are contemplated, such as fall within the spirit and scope of the invention as claimed.

What I claim is:

1. A cutter for circular cakes comprising a circular frame embodying a heavy ring of circular cross section, and a length of wire strung in and anchored to the frame so as to provide equally spaced radial portions constituting cutting elements.

2. A cutter for circular cakes comprising a circular frame embodying a circular ring of circular cross section, and a plurality of equally spaced radial cutting elements anchored in the frame, said cutting elements being joined at the axis of the frame and anchored at their outer ends to the frame, and diametrically opposed horizontal U-shaped handles carried by and rigid with and projecting outwardly from the frame.

3. A cutter for circular cakes comprising a circular frame embodying a circular ring of circular cross section, and a plurality of equally spaced radial cutting elements anchored in the frame, said cutting elements being joined at the axis of the frame and anchored at their outer ends to the frame, and a pressure device to facilitate the application of downward pressure upon the frame, said pressure device comprising a spider having radial equally spaced tubular arms and angular arms having their inner ends fitted and secured in said tubular arms and providing depending outer end portions having saddles on their lower ends adapted to seat upon the frame at equally spaced points.

4. A cutter for circular cakes comprising a circular frame embodying a heavy ring of circular cross section, and a length of fine wire strung in and anchored to the frame so as to provide equally spaced radial portions constituting cutting elements, and anchoring tongues struck from the frame and around which the fine wire is threaded, said tongues being flexible to place the fine wire under additional tension after being strung in the frame.

5. A cutter for circular cakes comprising a circular frame, said frame including a heavy wire ring and a circular sheet metal ring, the outer marginal portion of said sheet metal ring being rolled snugly about the wire ring and the inner marginal portion of the sheet metal ring being flat and projecting inwardly of said wire ring, a plurality of sets of anchoring fingers struck upwardly from the inner marginal portion of said sheet metal ring, said sets being arranged in two series and the fingers of the sets of each series being equally spaced, the adjacent sets of fingers of the two series being spaced apart twice the distance of the spacing between the sets of each series, and a single length of fine wire anchored at its ends to the inner marginal portion of the sheet metal ring at points intermediate the two series, said fine wire being passed repeatedly diametrically of the frame and around the sets of fingers so as to provide a plurality of equally spaced portions forming cutting elements disposed radially of the frame.

6. A cutter for circular cakes comprising a frame embodying a heavy wire ring having anchoring fingers struck therefrom at the outer sides thereof, and a single length of fine wire strung on the frame and passing over said fingers, said fine wire having a plurality of portions extending radially of the ring in equally spaced relation and constituting cutting elements.

7. A cutter for circular cakes comprising a frame embodying a heavy wire ring having anchoring fingers struck therefrom at the outer sides thereof, and a single length of fine wire strung on the frame and passing over said fingers, said fine wire having a plurality of portions extending radially of the ring in equally spaced relation and constituting cutting elements, there being an opening through the ring in spaced relation to and at each side of each anchoring finger through which the fine wire is extended.

ALFREDO J. PARRAGA.